(12) United States Patent
Iwasaki

(10) Patent No.: US 10,627,519 B2
(45) Date of Patent: Apr. 21, 2020

(54) INFORMATION PROCESSING DEVICE AND INFORMATION PROCESSING METHOD

(71) Applicant: SONY CORPORATION, Tokyo (JP)

(72) Inventor: Masanori Iwasaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 506 days.

(21) Appl. No.: 15/329,320

(22) PCT Filed: Aug. 3, 2015

(86) PCT No.: PCT/JP2015/071913
§ 371 (c)(1),
(2) Date: Jan. 26, 2017

(87) PCT Pub. No.: WO2016/024487
PCT Pub. Date: Feb. 18, 2016

(65) Prior Publication Data
US 2017/0212240 A1 Jul. 27, 2017

(30) Foreign Application Priority Data

Aug. 13, 2014 (JP) .................. 2014-164768
Jan. 7, 2015 (JP) .................. 2015-001516

(51) Int. Cl.
*G01C 3/08* (2006.01)
*G01S 17/89* (2020.01)
(Continued)

(52) U.S. Cl.
CPC .............. *G01S 17/89* (2013.01); *G01S 17/50* (2013.01); *H04R 3/00* (2013.01); *H04R 23/008* (2013.01); *H04R 29/00* (2013.01); *H04R 2430/01* (2013.01)

(58) Field of Classification Search
CPC ......... G01S 17/89; G01S 17/50; H04R 20/00; H04R 3/00; H04R 23/008; H04R 2430/01
(Continued)

(56) References Cited

U.S. PATENT DOCUMENTS 7,775,113 B2 * 8/2010 Bakish .................. G01H 9/00
398/130
8,072,581 B1 * 12/2011 Breiholz .................. G01S 7/51
356/4.01
2010/0226543 A1 9/2010 Zalevsky et al.

FOREIGN PATENT DOCUMENTS

JP 2002-243534 A 8/2002
JP 2006-313116 A 11/2006
(Continued)

*Primary Examiner* — Mark Hellner
(74) *Attorney, Agent, or Firm* — Chip Law Group

(57) ABSTRACT

An information processing device according to one aspect of the present disclosure is provided with an obtaining unit which obtains a speckle image obtained by imaging an interference state of reflection light of light obtained when irradiating an object with coherent light, a distance measuring unit which measures a distance to the object, a measuring unit which measures a movement amount of the obtained speckle image, and an arithmetic unit which performs an arithmetic operation of relative displacement amounts of surfaces of a plurality of objects on the basis of movement amounts of speckle images corresponding to the plurality of objects at different distances from an object plane on which the speckle image appears and measured distances to the objects. The present disclosure is applicable to an audio detecting system, for example.

16 Claims, 10 Drawing Sheets

(51) Int. Cl.
    *G01S 17/50*     (2006.01)
    *H04R 3/00*     (2006.01)
    *H04R 23/00*     (2006.01)
    *H04R 29/00*     (2006.01)

(58) Field of Classification Search
    USPC .................................................. 356/5.01
    See application file for complete search history.

(56) References Cited

FOREIGN PATENT DOCUMENTS

| | | |
|---|---|---|
| JP | 2012-049748 A | 3/2012 |
| JP | 2013-002884 A | 1/2013 |

\* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2015/071913 filed on Aug. 3, 2015, which claims priority benefit of Japanese Patent Application No. JP 2014-164768 filed in the Japan Patent Office on Aug. 13, 2014 and also claims priority benefit of Japanese Patent Application No. JP 2015-001516 filed in the Japan Patent Office on Jan. 7, 2015. Each of the above-referenced applications is hereby incorporated herein by reference in its entirety.

TECHNICAL FIELD

The present disclosure relates to an information processing device, an information processing method, and a program, and especially relates to the information processing device, the information processing method, and the program capable of detecting relative audio volumes of a plurality of audio sources.

BACKGROUND ART

There conventionally is an invention capable of reproducing audio emitted by an audio source by irradiating the audio source with laser light being coherent light and analyzing a speckle image representing an interference state of the reflection light (for example, refer to Patent Document 1).

CITATION LIST

Patent Document

Patent Document 1: US 2010/0226543

SUMMARY OF THE INVENTION

Problems to be Solved by the Invention

According to the invention disclosed in Patent Document 1, it is possible to irradiate a throat of a person (audio source) located at a distance at which audio does not directly arrive with laser light, for example, shoot a video of a speckle image of the reflection light to extract a vibration frequency and vibration amplitude of the speckle image, and perform predetermined signal processing, thereby reproducing the audio emitted by the person.

However, in the invention disclosed in Patent Document 1, when there is a plurality of audio sources, it is not possible to obtain relative audio volumes of them.

The present disclosure is achieved in view of such a condition and an object thereof is to obtain the relative audio volumes of a plurality of audio sources.

Solutions to Problems

An information processing device according to one aspect of the present disclosure is provided with an obtaining unit which obtains a speckle image obtained by imaging an interference state of reflection light of light obtained when irradiating an object with coherent light, a distance measuring unit which measures a distance to the object, a measuring unit which measures a movement amount of the obtained speckle image, and an arithmetic unit which performs an arithmetic operation of relative displacement amounts of surfaces of a plurality of objects on the basis of movement amounts of speckle images corresponding to the plurality of objects at different distances from an object plane on which the speckle image appears and measured distances to the objects.

The object may be an audio source, and the arithmetic unit may perform an arithmetic operation of an audio volume ratio of a plurality of audio sources on the basis of the movement amounts of the speckle images corresponding to the plurality of audio sources at different distances from the object plane on which the speckle image appears and the measured distances to the audio sources.

The information processing device according to one aspect of the present disclosure may be further provided with a lighting unit which irradiates the object with the coherent light.

The lighting unit may irradiate the object with laser light or LED light.

The distance measuring unit may measure the distance to the object by using the coherent light emitted from the lighting unit.

The distance measuring unit may measure the distance to the object by a TOF method using the coherent light emitted from the lighting unit.

The distance measuring unit may measure the distance to the object by using parallax when the object is imaged by a plurality of cameras.

The distance measuring unit may measure a ratio of the distances to the objects or the distances by using image heights on an image pickup element when the objects are imaged by a single camera.

The distance measuring unit may specify the objects by image processing of an imaged image by a single camera and calculate a ratio of the distances to the objects by using image heights on an image pickup element and a focal distance of an image forming element when the specified objects are imaged or measure the distances to the objects by using an average value of heights of the specified objects.

The distance measuring unit may specify the objects by image processing of an imaged image by a single camera, obtain information of the specified objects from a database, and calculate a ratio of the distances to the objects by using image heights on an image pickup element and a focal distance of an image forming element when the objects are imaged or measure the distances to the objects by using an average value of heights of the objects.

The information processing device according to one aspect of the present disclosure may be further provided with the database.

The distance measuring unit may obtain the information of the specified objects by communicating with the database arranged outside.

The obtaining unit may also serve as the distance measuring unit.

The information processing device according to one aspect of the present disclosure may be further provided with a focal distance obtaining unit which obtains a focal distance of a lens of an imaging unit which images the speckle image, and a correcting unit which corrects the measured movement amount of the speckle image by using obtained focal distances when the speckle images corresponding to the plurality of objects are imaged, wherein the arithmetic unit may perform the arithmetic operation of the relative displacement amounts of the surfaces of the plurality of objects on the basis of the corrected movement amount of the speckle image and the measured distances to the audio sources.

The arithmetic unit may further perform an arithmetic operation of audio volumes of the plurality of audio sources on the basis of the audio volume ratio of the plurality of audio sources the arithmetic operation of which is performed.

An information processing method according to one aspect of the present disclosure is provided with an obtaining step of obtaining a speckle image obtained by imaging an interference state of reflection light of light obtained when irradiating an object with coherent light, a distance measuring step of measuring a distance to the object, a measuring step of measuring a movement amount of the obtained speckle image, and an arithmetic step of performing an arithmetic operation of relative displacement amounts of surfaces of a plurality of objects on the basis of movement amounts of speckle images corresponding to the plurality of objects at different distances from an object plane on which the speckle image appears and measured distances to the objects, the method performed by an information processing device.

A program according to one aspect of the present disclosure allows a computer to serve as an obtaining unit which obtains a speckle image obtained by imaging an interference state of reflection light of light obtained when irradiating an object with coherent light, a distance measuring unit which measures a distance to the object, a measuring unit which measures a movement amount of the obtained speckle image, and an arithmetic unit which performs an arithmetic operation of relative displacement amounts of surfaces of a plurality of objects on the basis of movement amounts of speckle images corresponding to the plurality of objects at different distances from an object plane on which the speckle image appears and measured distances to the objects.

According to one aspect of the present disclosure, a speckle image obtained by imaging an interference state of reflection light of light obtained when irradiating an object with coherent light is obtained, a distance to the object is measured, and a movement amount of the obtained speckle image is measured. Furthermore, an arithmetic operation of relative displacement amounts of surfaces of a plurality of objects is performed on the basis of movement amounts of speckle images corresponding to the plurality of objects at different distances from an object plane on which the speckle image appears and measured distances to the objects.

Effects of the Invention

According to one aspect of the present disclosure, an audio volume ratio of a plurality of audio sources at different distances may be obtained.

MODE FOR CARRYING OUT THE INVENTION

A best mode for carrying out the present disclosure (hereinafter, referred to as an embodiment) is hereinafter described in detail with reference to the drawings.

<Configuration Example of Audio Detecting System>

Figure 1:
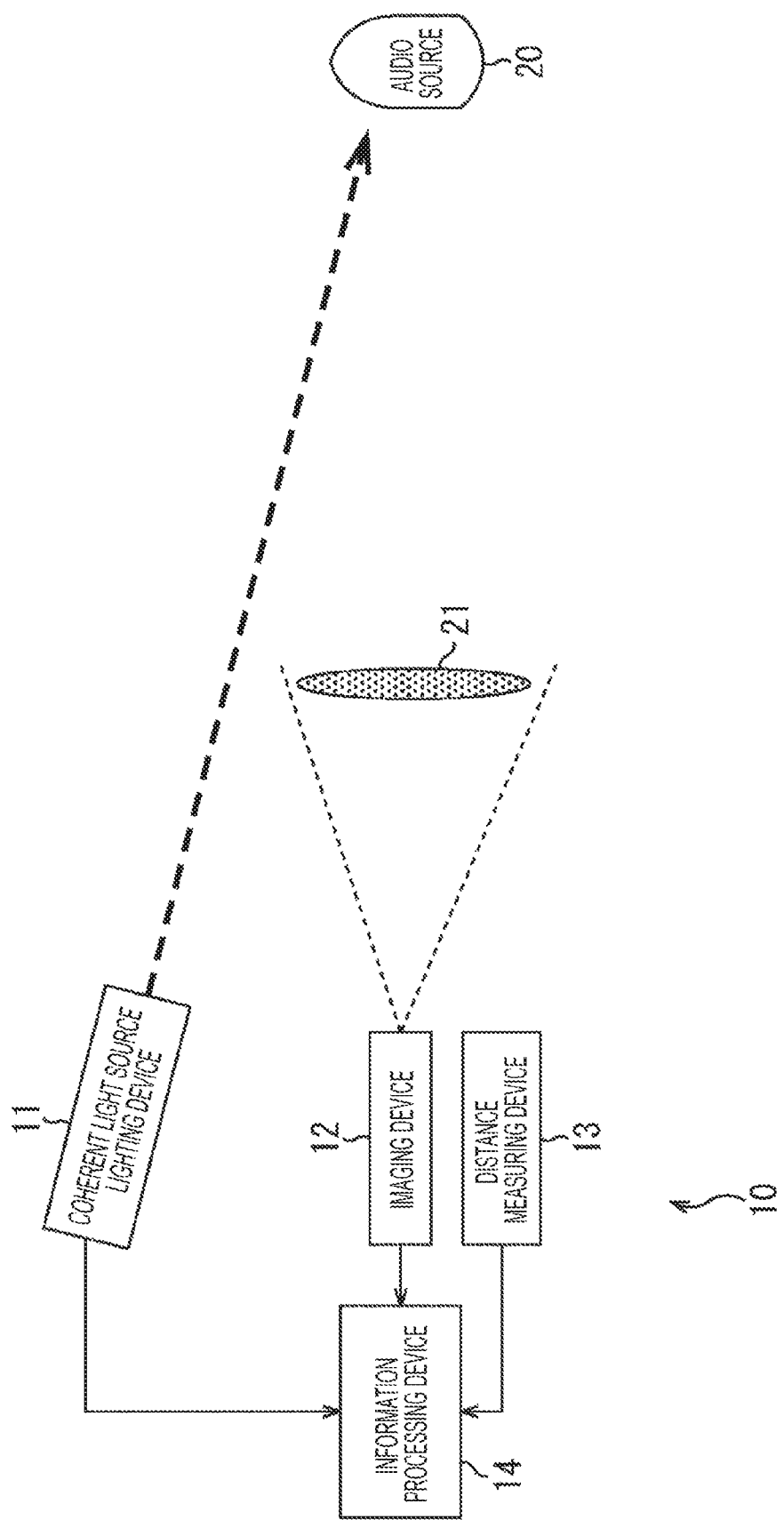
FIG. 1 is a block diagram illustrating a configuration example of an audio detecting system to which the present disclosure is applied.

FIG. 1 illustrates a configuration example of an audio detecting system to which the present disclosure is applied. An audio detecting system 10 is formed of a coherent light source lighting device 11, an imaging device 12, a distance measuring device 13, and an information processing device 14.

The coherent light source lighting device 11 including a light source which generates laser light being coherent light built-in irradiates an audio source 20 with generated laser light. Meanwhile, it is also possible to adopt a light source which generates LED light and the like having partial coherence in place of the light source which generates the laser light.

The imaging device 12 shoots a video of a speckle image 21 on an object plane representing an interference state of reflection light of irradiation light with which the audio source 20 vibrating in association with audio generation is irradiated and outputs a moving image signal obtained as a result to the information processing device 14. It is supposed that the object plane is separated from the audio source 20 by a distance at which there is an effect of Fraunhofer diffraction ($D^2/4\lambda$) or longer. Herein, D represents a spot diameter of the laser light and $\lambda$ represents a wavelength of the laser light. The imaging device 12 also supplies a distance $L_0$ to the speckle image 21 to be imaged (an object side focal position) and a focal distance f of a lens at the time of imaging to the information processing device 14.

The distance measuring device 13 measures distances $L_1$, $L_2$ and the like from the imaging device 12 to the audio source 20. When measuring the distance, it is possible to image the audio source 20 by a plurality of cameras and use parallax of a plurality of images obtained as a result, for example. It is also possible to integrate the distance measuring device 13 and the coherent light source lighting device 11 and use a time of flight (TOF) method of measuring reciprocating time elapsed from irradiation of the audio source 20 with the laser light and the like by the coherent light source lighting device 11 and return of the reflection light thereof to the distance measuring device 13 to obtain a distance. Furthermore, it is also possible to calculate the distance on the basis of a diameter of the laser light emitted by the coherent light source lighting device 11 and a diameter of the speckle image 21 imaged by the imaging device 12.

Furthermore, the distance measuring device 13 may also calculate a relative distance between the imaging device and the audio source 20 from an imaged image. It is also possible that the imaging device 12 itself calculates the relative distance to the audio source 20 from the imaged image in place of providing the distance measuring device 13 (to be described later in detail).

Figure 3:
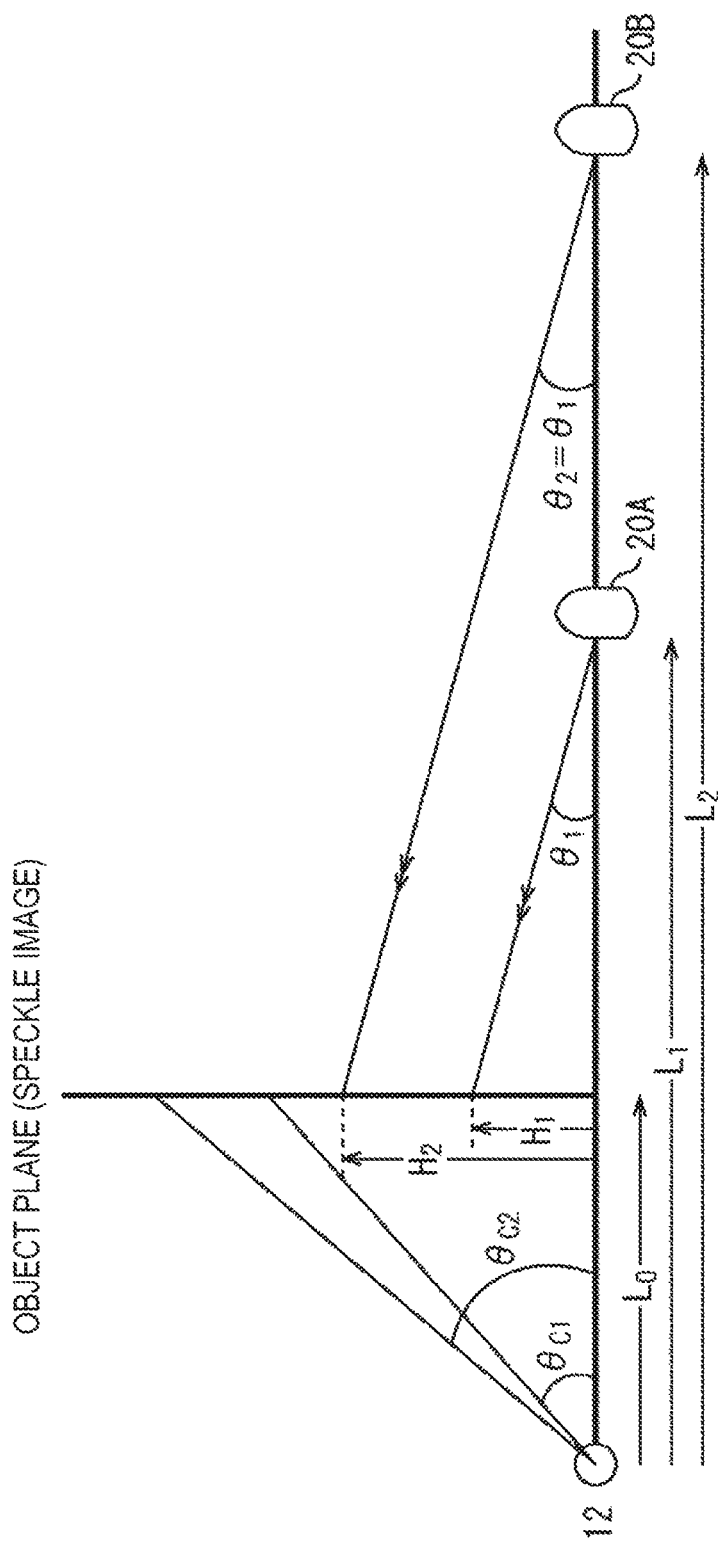
FIG. 3 is a view illustrating positional relationship among an imaging device, an audio source, and an object plane.

The information processing device 14 measures a movement amount H of the imaged speckle image 21 and calculates an audio volume ratio between a first audio source 20A and a second audio source 20B at different distances from the imaging device 12 (FIG. 3). Herein, the movement amount H of the speckle image 21 indicates a displacement amount on the object plane of the speckle image 21 changing corresponding to the vibration of the audio source 20 and this is proportional to an audio volume of the audio source 20.

<Detailed Configuration Example of Information Processing Device 14>

Figure 2:
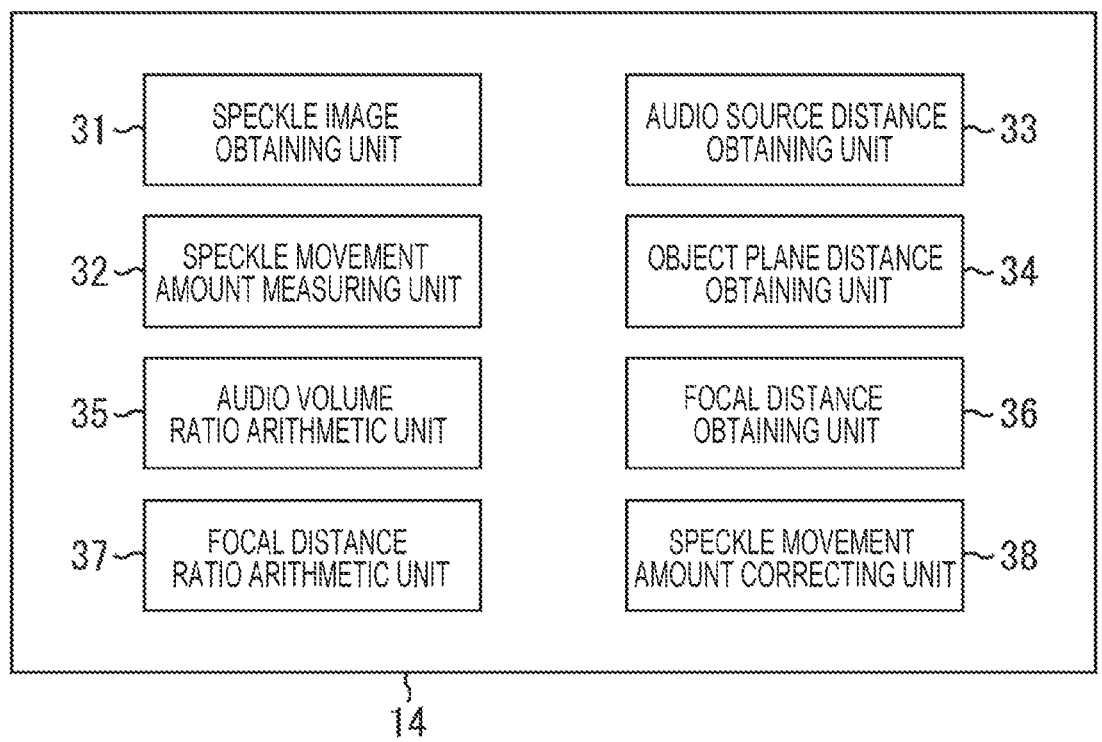
FIG. 2 is a block diagram illustrating a configuration example of an information processing device in FIG. 1.

Next, FIG. 2 illustrates a detailed configuration example of the information processing device 14. FIG. 3 illustrates positional relationship among the imaging device 12, the first audio source 20A, the second audio source 20B, and the object plane (speckle image 21).

The information processing device 14 includes a speckle image obtaining unit 31, a speckle movement amount measuring unit 32, an audio source distance obtaining unit 33, an object plane distance obtaining unit 34, an audio volume ratio arithmetic unit 35, a focal distance obtaining unit 36, a focal distance ratio arithmetic unit 37, and a speckle movement amount correcting unit 38.

The speckle image obtaining unit 31 obtains the moving image signal of the speckle image 21 imaged by the imaging device 12. The speckle movement amount measuring unit 32 measures movement amounts $H_1$ and $H_2$ of the speckle image 21. The speckle movement amount $H_1$ corresponds to the speckle image 21 of the first audio source 20A located at the distance $L_1$ from the imaging device 12 and the speckle movement amount $H_2$ corresponds to the speckle image 21 of the second audio source 20B located at the distance $L_2$ from the imaging device 12.

The audio source distance obtaining unit 33 controls the distance measuring device 13 to measure the distance $L_1$ from the imaging device 12 to the first audio source 20A and the distance $L_2$ from the imaging device 12 to the second audio source 20B to obtain a measured result.

The object plane distance obtaining unit 34 obtains the distance $L_0$ from the imaging device 12 to the object plane on which the speckle image 21 appears from the imaging device 12. The audio volume ratio arithmetic unit 35 performs an arithmetic operation of the audio volume ratio of audio output from the first audio source 20A and that output from the second audio source 20B (the audio volume of one of the first and second audio sources 20A and 20B relative to the other) on the basis of the speckle movement amounts $H_1$ and $H_2$ and the distances $L_0$, $L_1$, and $L_2$.

The focal distance obtaining unit 36 obtains the focal distances $f_1$ and $f_2$ at the time of the imaging of the speckle image 21 when the imaging device 12 includes a zoom lens capable of changing the focal distance built-in. The focal distance $f_1$ corresponds to the imaging of the speckle image 21 of the first audio source 20A and the focal distance $f_2$ corresponds to the imaging of the speckle image 21 of the second audio source 20B.

The focal distance ratio arithmetic unit 37 performs an arithmetic operation of a ratio $f_2/f_1$ of the focal distances $f_1$ and $f_2$. The speckle movement amount correcting unit 38 corrects a speckle movement amount $H_3$ on the basis of the focal distance ratio. In this case, the audio volume ratio arithmetic unit 35 performs the arithmetic operation of the audio volume ratio by using the corrected speckle movement amount $H_3$.

<Principle of Audio Volume Ratio Arithmetic Operation>

Next, a method of performing the arithmetic operation of the audio volume ratio (the audio volume of the audio source 20B relative to that of the audio source 20A) is described.

In FIG. 3, $L_0$ represents the distance from the imaging device 12 to the object plane. $L_1$ represents the distance from the imaging device 12 to the first audio source 20A. $L_2$ represents the distance from the imaging device 12 to the second audio source 20B. $H_1$ represents the speckle movement amount corresponding to the first audio source 20A. $H_2$ represents the speckle movement amount corresponding to the second audio source 20B. $\theta_1$ represents a speckle movement angle corresponding to the first audio source 20A. $\theta_2$ represents a speckle movement angle corresponding to the second audio source 20B. $\theta_{c1}$ represents a camera view angle when the focal distance of the lens of the imaging device 12 is $f_1$. $\theta_{c2}$ represents a camera view angle when the focal distance of the lens of the imaging device 12 is $f_2$.

Herein, suppose that the focal distance of the lens of the imaging device 12 is fixed as a precondition. Also, the audio volume of the second audio source 20B is equal to the audio volume of the first audio source 20A. In this case, the speckle movement angle $\theta_2 = \theta_1$.

Following equation (1) holds true on the basis of relationship of $\theta_2 = \theta_1$.

$$(L_1 - L_0):(L_2 - L_0) = H_1 : H_2 \qquad (1)$$

Next, a case in which the audio volume of the second audio source 20B becomes smaller than that of the first audio source 20A is considered.

Figure 4:
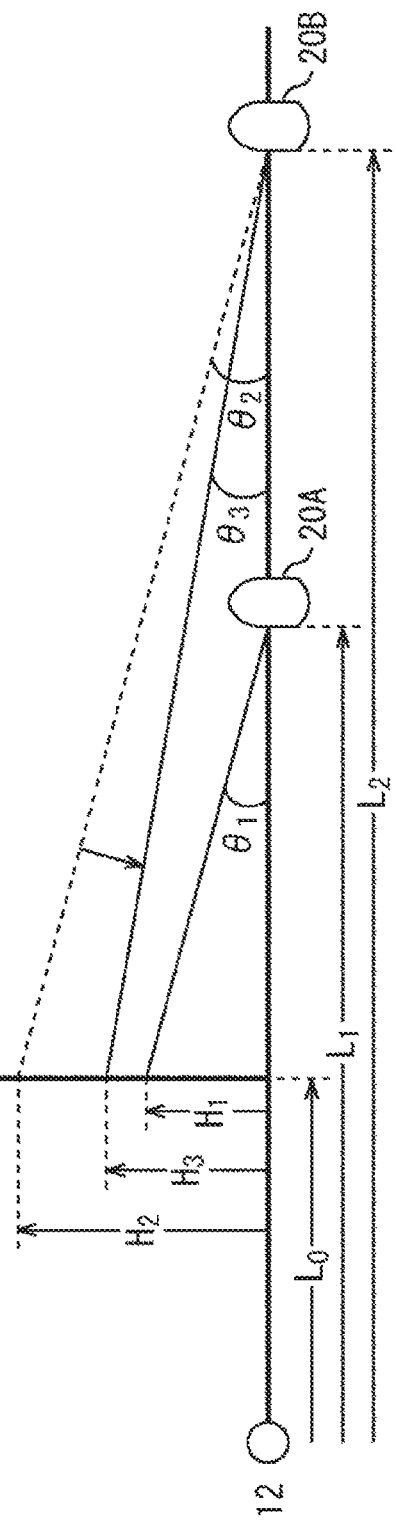
FIG. 4 is a view illustrating change in speckle movement angle in association with change in audio volume.

FIG. 4 illustrates change in the speckle movement angle when the audio volume of the second audio source 20B becomes smaller than that of the first audio source 20A.

The speckle movement angle $\theta_2$ in this case is $\theta_3$ smaller than the speckle movement angle $\theta_1$ as represented by following equation (2).

$$\text{Speckle movement angle } \theta_2 = \theta_3 < \theta_1 \qquad (2)$$

Then, as the speckle movement angle $\theta_2$ changes, the speckle movement amount changes from $H_2$ to $H_3$. The state illustrated in FIG. 4 may be represented by following equation (3) by using a trigonometric function.

As for first audio source 20A, $$\tan \theta_1 = H_1/(L_1 - L_0), \text{ and}$$

as for second audio source 20B, $$\tan \theta_3 = H_3/(L_2 - L_0) \qquad (3)$$

Following equation (4) is derived from equation (3).

$$\theta_1 = \tan^{-1}(H_1/(L_1 - L_0))$$

$$\theta_3 = \tan^{-1}(H_3/(L_2 - L_0)) \qquad (4)$$

Since the speckle movement angle $\theta_2$ becomes from $\theta_1$ to $\theta_3$ in association with the change in the audio volume of the second audio source 20B, it is considered that following equation (5) holds true.

Audio volume of second audio source 20B relative to that of first audio source 20A $$= \text{current audio volume of second audio source } 20B / \text{audio volume of first audio source } 20A$$

$$= \theta_3/\theta_1 \qquad (5)$$

Substituting equation (4) into equation (5) brings following equation (6) for performing the arithmetic operation of the audio volume of the second audio source 20B relative to that of the first audio source 20A.

Audio volume of second audio source 20B relative to that of first audio source 20A $= \theta_3/\theta_1$ $= (\tan^{-1}(H_3/(L_2-L_0)))/(\tan^{-1}(H_1/(L_1-L_0)))$ (6)

From equation (6), it is understood that the arithmetic operation of the audio volume of the second audio source 20B relative to that of the first audio source 20A may be performed by using the distances $L_0$, $L_1$, and $L_2$ and the speckle movement amounts $H_3$ and $H_1$.

<First Relative Audio Volume Measuring Process by Information Processing Device 14>

Figure 5:
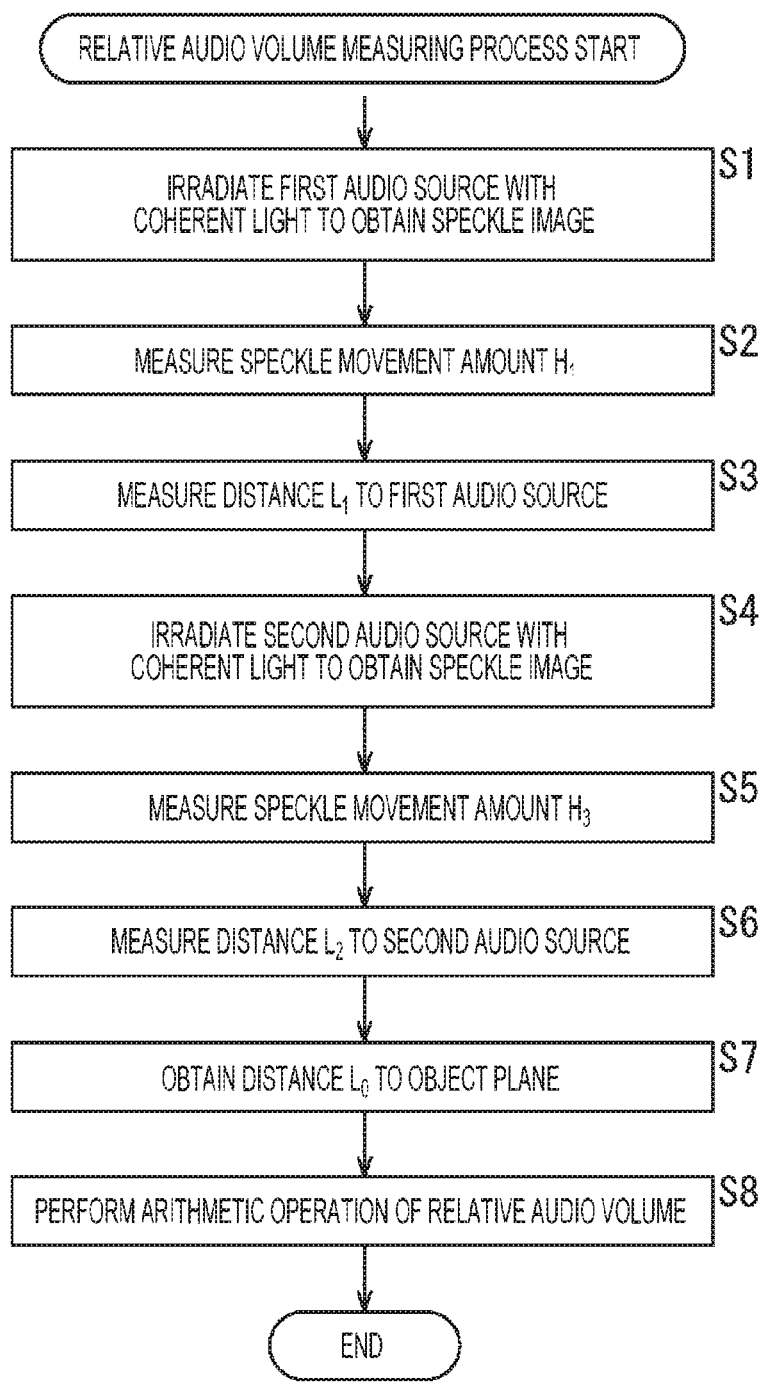
FIG. 5 is a flowchart illustrating a relative audio volume measuring process when a focal distance is fixed.

Next, FIG. 5 is a flowchart illustrating a relative audio volume measuring process by the information processing device 14.

The relative audio volume measuring process is based on a precondition that the focal distance of the lens of the imaging device 12 is fixed.

At step S1, the coherent light source lighting device 11 irradiates the first audio source 20A and the imaging device 12 images a speckle image 21A representing the interference state of the reflection light from the first audio source 20A. The speckle image obtaining unit 31 obtains a moving image signal of the imaged speckle image 21A to output to the speckle movement amount measuring unit 32.

At step S2, the speckle movement amount measuring unit 32 measures the speckle movement amount $H_1$ from the moving image signal of the speckle image 21A to output to the audio volume ratio arithmetic unit 35. At step S3, the audio source distance obtaining unit 33 obtains the distance $L_1$ from the imaging device 12 to the first audio source 20A from the distance measuring device 13 to output to the audio volume ratio arithmetic unit 35.

At step S4, the coherent light source lighting device 11 irradiates the second audio source 20B and the imaging device 12 images the speckle image 21B representing the interference state of the reflection light from the second audio source 20B. The speckle image obtaining unit 31 obtains a moving image signal of the imaged speckle image 21B to output to the speckle movement amount measuring unit 32.

At step S5, the speckle movement amount measuring unit 32 measures the speckle movement amount $H_3$ from the moving image signal of the speckle image 21B to output to the audio volume ratio arithmetic unit 35. At step S6, the audio source distance obtaining unit 33 obtains the distance $L_2$ from the imaging device 12 to the second audio source 20B from the distance measuring device 13 to output to the audio volume ratio arithmetic unit 35.

At step S7, the object plane distance obtaining unit 34 obtains the distance $L_0$ to the object plane from the imaging device 12 to output to the audio volume ratio arithmetic unit 35.

At step S8, the audio volume ratio arithmetic unit 35 substitutes values of the distances $L_0$, $L_1$, and $L_2$ and the speckle movement amounts $H_3$ and $H_1$ into equation (6), thereby performing the arithmetic operation of the audio volume ratio (the audio volume of the second audio source 20B relative to that of the first audio source 20A). The description of the relative audio volume measuring process based on the precondition that the focal distance of the lens of the imaging device 12 is fixed herein ends.

Meanwhile, imaging the speckle image of the audio source the audio volume of which is known in advance and measuring the movement amount thereof to record as an absolute audio volume after calibration makes it possible to correctly measure the audio volume of the first audio source 20A and to correctly obtain the audio volume of the second audio source 20B according to the audio volume ratio the arithmetic operation of which is performed by the audio volume ratio arithmetic unit 35 from the audio volume of the first audio source 20A.

<Regarding Case in which Focal Distance of Imaging Device 12 is Variable>

Next, a case in which the focal distance of the imaging device 12 is variable is described.

Figure 6:
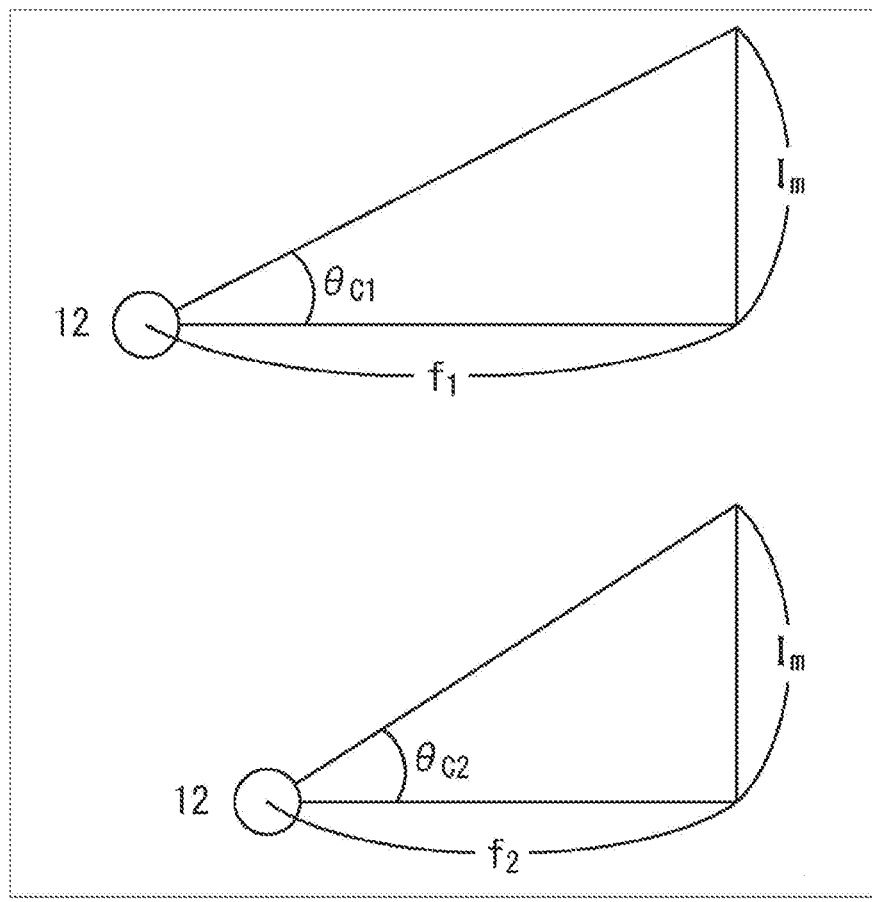
FIG. 6 is a view illustrating relationship among the focal distance of the imaging device, a camera view angle, and a size of an image sensor.

FIG. 6 illustrates relationship among the focal distance f of the imaging device 12, the camera view angle $\theta_c$, and a size $I_m$ of an image sensor of the imaging device 12.

As illustrated in this drawing, when the camera view angle when the focal distance is $f_1$ is set to $\theta_{c1}$, and the camera view angle when the focal distance is $f_2$ is set to $\theta_{c2}$, there is relationship represented by following equation (7) by using a trigonometric function.

$\tan \theta_{c1} = I_m/f_1$ $\tan \theta_{c2} = I_m/f_2$ (7)

Following equation (8) is derived from equation (7).

$f_1 \cdot \tan \theta_{c1} = f_2 \cdot \tan \theta_{c2}$ $\tan \theta_{c2} = (f_1/f_2) \tan \theta_{c1}$ (8)

At the same time, a height of the object plane when the focal distance is $f_1$ and the camera view angle is $\theta_{c1}$ is $L_0 \cdot \tan \theta_{c1}$, and the height of the object plane when the focal distance is $f_2$ and the camera view angle is $\theta_{c2}$ is $L_0 \cdot \tan \theta_{c2}$. Therefore, when the speckle movement amount H is imaged at the focal distance $f_1$, the size thereof on the image sensor is $H/L_0 \cdot \tan \theta_{c1}$, and when the same speckle movement amount H is imaged at the focal distance $f_2$, the size thereof on the image sensor is $H/L_0 \cdot \tan \theta_{c2}$, so that a ratio therebetween is represented by following equation (9). Ratio between sizes on image sensor when same speckle movement amount is imaged at focal distance $f_1$ and at focal distance $f_2$ $= (H/L_0 \cdot \tan \theta_{c2})/(H/L_0 \cdot \tan \theta_{c1})$ $= L_0 \cdot \tan \theta_{c1}/L_0 \cdot \tan \theta_{c2}$ $= \tan \theta_{c1}/\tan \theta_{c2}$ (9)

Substituting equation (8) into equation (9) brings following equation (10).

Ratio between sizes on image sensor when same speckle movement amount is imaged at focal distance $f_1$ and at focal distance $f_1$ $= f_2/f_1$ (10)

As is clear from equation (10), the ratio between the sizes on the image sensor when the same speckle movement amount is imaged at the focal distance $f_1$ and at the focal distance $f_2$ is the ratio between the focal distances $f_2/f_1$. Therefore, when the ratio between the focal distances is used, it is possible to correct the speckle movement amount H of the speckle image 21 imaged at the focal distance $f_2$ to a speckle movement amount H' obtained when this is imaged at the focal distance $f_1$.

Specifically, it is possible to obtain the corrected speckle movement amount H' by multiplying a reciprocal number $f_1/f_2$ of the focal distance ratio $f_2/f_1$ by the speckle movement amount H of the speckle image 21 imaged at the focal distance $f_2$.

<Second Relative Audio Volume Measuring Process by Information Processing Device 14>

Figure 7:
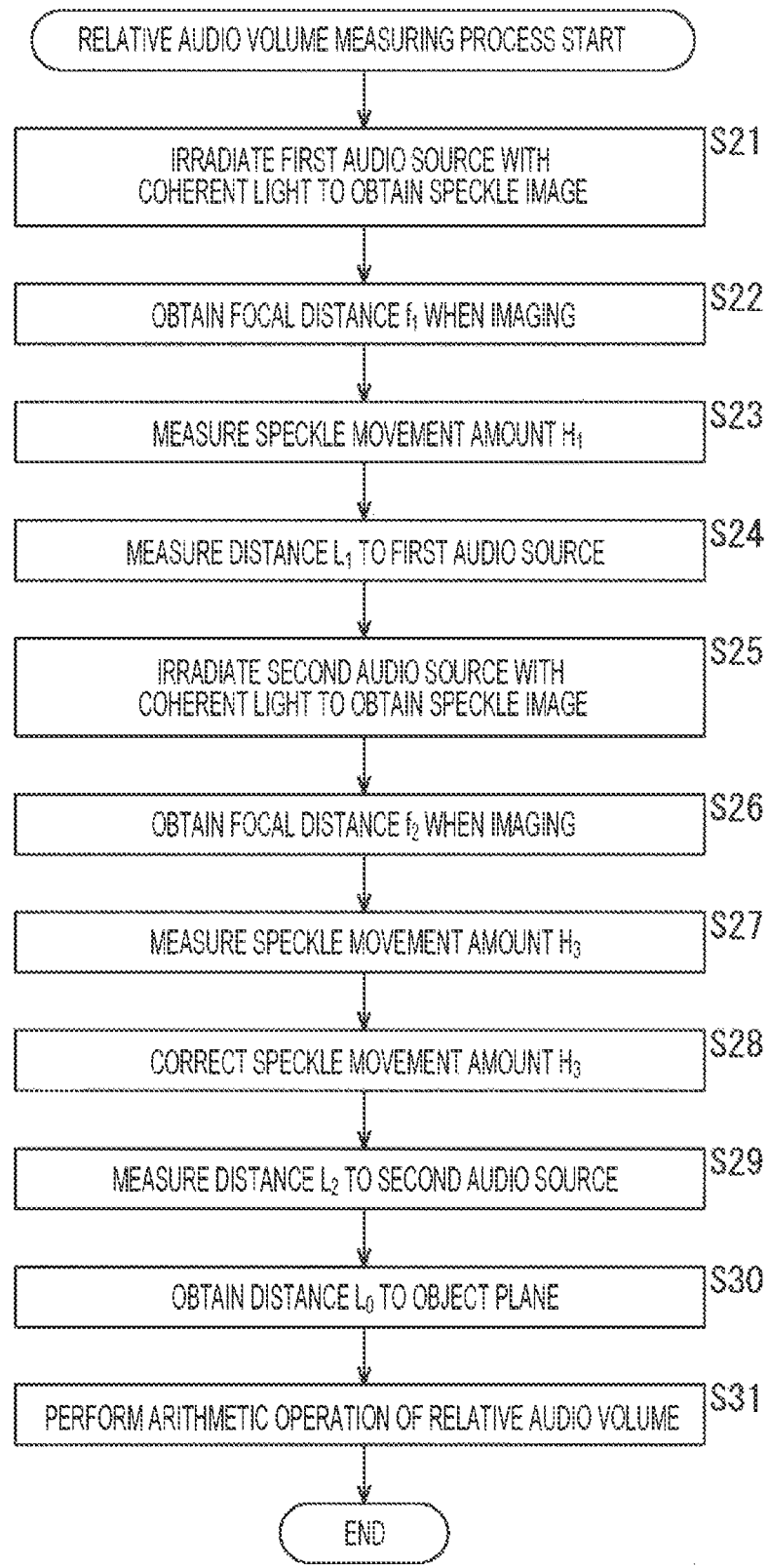
FIG. 7 is a flowchart illustrating the relative audio volume measuring process when the focal distance is variable.

Next, FIG. 7 is a flowchart illustrating the relative audio volume measuring process by the information processing device 14.

In the relative audio volume measuring process in which the focal distance of the lens of the imaging device 12 is variable, the focal distance when the speckle image corresponding to the first audio source 20A is imaged is set to $f_1$ and the focal distance when the speckle image corresponding to the second audio source 20B is imaged is set to $f_2$.

At step S21, the coherent light source lighting device 11 irradiates the first audio source 20A and the imaging device 12 images the speckle image 21A representing the interference state of the reflection light from the first audio source 20A at the focal distance $f_1$. The speckle image obtaining unit 31 obtains a moving image signal of the imaged speckle image 21A to output to the speckle movement amount measuring unit 32. At step S22, the focal distance obtaining unit 36 obtains the focal distance (in this case, $f_1$) at the time of the imaging from the imaging device 12 and notifies the focal distance ratio arithmetic unit 37 of the same.

At step S23, the speckle movement amount measuring unit 32 measures the speckle movement amount $H_1$ from the moving image signal of the speckle image 21A to output to the audio volume ratio arithmetic unit 35. At step S24, the audio source distance obtaining unit 33 obtains the distance $L_1$ from the imaging device 12 to the first audio source 20A from the distance measuring device 13 to output to the audio volume ratio arithmetic unit 35.

At step S25, the coherent light source lighting device 11 irradiates the second audio source 20B and the imaging device 12 images the speckle image 21 representing the interference state of the reflection light from the second audio source 20B at the focal distance $f_2$. The speckle image obtaining unit 31 obtains a moving image signal of the imaged speckle image 21B to output to the speckle movement amount measuring unit 32. At step S26, the focal distance obtaining unit 36 obtains the focal distance (in this case, $f_2$) at the time of the imaging from the imaging device 12 and notifies the focal distance ratio arithmetic unit 37 of the same.

At step S27, the speckle movement amount measuring unit 32 measures the speckle movement amount $H_3$ from the moving image signal of the speckle image 21B to output to the speckle movement amount correcting unit 38.

At step S28, the focal distance ratio arithmetic unit 37 performs the arithmetic operation of the focal distance ratio $f_2/f_1$ when the speckle images 21A and 21B are imaged and notifies the speckle movement amount correcting unit 38 of the same. The speckle movement amount correcting unit 38 multiples the reciprocal number $f_1/f_2$ of the focal distance ratio by the speckle movement amount $H_3$ and outputs the corrected speckle movement amount $H_3$ obtained as a result to the audio volume ratio arithmetic unit 35.

At step S29, the audio source distance obtaining unit 33 obtains the distance $L_2$ from the imaging device 12 to the second audio source 20B from the distance measuring device 13 to output to the audio volume ratio arithmetic unit 35.

At step S30, the object plane distance obtaining unit 34 obtains the distance $L_0$ to the object plane from the imaging device 12 to output to the audio volume ratio arithmetic unit 35.

At step S31, the audio volume ratio arithmetic unit 35 substitutes the values of the distances $L_0$, $L_1$, and $L_2$ and the speckle movement amounts $H_3$ and $H_1$ into equation (6), thereby performing the arithmetic operation of the audio volume ratio (the audio volume of the second audio source 20B relative to that of the first audio source 20A). The corrected value is used as the speckle movement amount $H_3$. The description of the relative audio volume measuring process based on the precondition that the focal distance of the lens of the imaging device 12 is variable herein ends.

Meanwhile, imaging the speckle image of the audio source the audio volume of which is known in advance and measuring the movement amount thereof to record as an absolute audio volume after calibration makes it possible to correctly measure the audio volume of the first audio source 20A and to correctly obtain the audio volume of the second audio source 20B according to the audio volume ratio the arithmetic operation of which is performed by the audio volume ratio arithmetic unit 35 from the audio volume of the first audio source 20A.

<Regarding Method of Calculating Relative Distance from Imaging Device 12 to Audio Source 20 by Imaging Device 12 Itself>

Although the distance measuring device 13 measures the relative distances $L_1$ and $L_2$ from the imaging device 12 to the audio source 20 in the description of the first and second relative audio volume measuring processes described above, it is also possible that the distance measuring device 13 is omitted and the imaging device 12 itself calculates the relative distance to the audio source 20 to measure the relative audio volume by using the relative distance.

Figure 8:
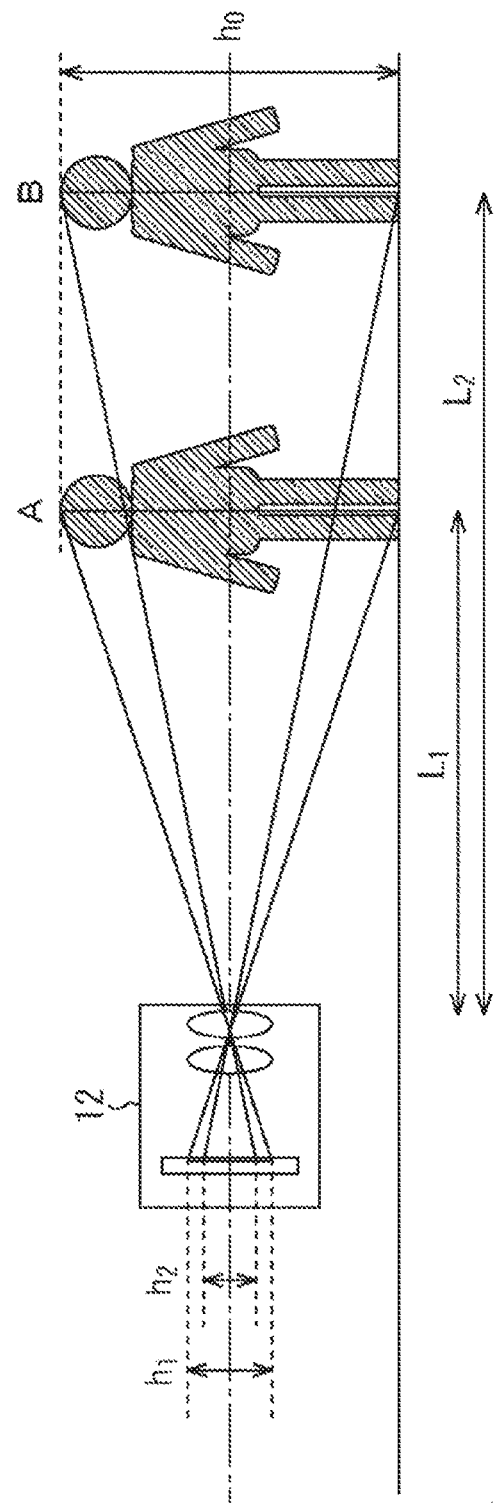
FIG. 8 is a view for illustrating a method of calculating a relative distance from the imaging device to the audio source.
Figure 9:
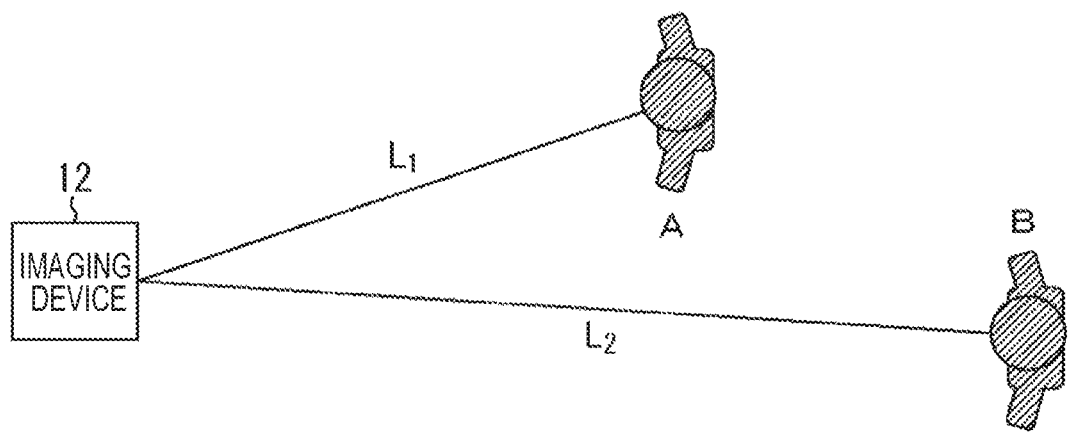
FIG. 9 is a view illustrating positional relationship between the imaging device and the audio source.

FIG. 8 illustrates positional relationship between the imaging device 12 and persons A and B as the audio sources 20. FIG. 9 illustrates a state in which the positional relationship in FIG. 8 is seen from above. Meanwhile, it is herein supposed that the persons A and B have the same body height of $h_0$ and the person A is located in a position at the distance $L_1$ from the imaging device 12 and the person B is located in a position at the distance $L_2$ longer than the distance $L_1$ from the imaging device 12.

Figure 10:
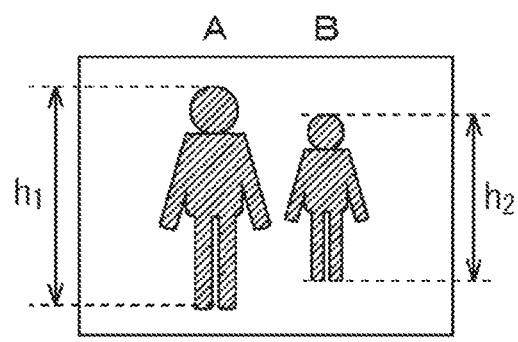
FIG. 10 is a view illustrating a formed image of the audio source.

When the persons A and B are imaged at the focal distance f by the imaging device 12, a formed image on an image pickup element of the imaging device 12 is as illustrated in FIG. 10. That is to say, a height of the person A in the formed image is $h_1$ and a height of the person B located farther is $h_2$. In this case, the distance $L_1$ from the imaging device 12 to the person A and the distance $L_2$ to the person B are represented by following equation (11) by the focal distance f and the heights in the formed image.

$$L_1 = f \times h_0/H_1$$

$$L_2 = f \times h_0/H_2 \quad (11)$$

The distance $L_2$ represented by following equation (12) is derived from equation (11).

$$L_2 = L_1 \times h_1/h_2 \quad (12)$$

Meanwhile, since $h_1/h_2$ in equation (12) may be obtained from the formed image, the distance $L_2$ may be represented as the relative distance of the distance $L_1$.

Therefore, when $L_1 \times h_1/h_2$ is substituted into $L_2$ of equation (6) with the distance $L_1$ unknown, the arithmetic operation of the audio volume of the second audio source 20B relative to that of the first audio source 20A $\theta_3/\theta_1$ may be performed.

Although it is supposed that the body heights of the person A and the person B are the same height of $h_0$ in the description above, the heights of the two persons may be different from each other. In general, the body heights of adults are within a range from 150 cm to 200 cm approximately, and an average body height generally falls within a limited range for each country and each race. For example, the average body heights of Dutchmen and Dutchwomen whose body heights are known to be high are 183.8 cm and 170.7 cm, respectively, those of Indonesian men and Indonesian women whose body heights are known to be low are 158 cm and 147 cm, respectively, and those of Japanese men and Japanese women are 170.7 cm and 158 cm, respectively.

If the body heights of the above-described persons A and B are 180 cm and 150 cm, respectively, there is an error in the body height with a ratio of 6:5; in other words, it may be said that an arithmetic operation of the relative audio volumes meeting actual use may be performed for use in which a relative error of approximately 6:5 is allowed.

It is also possible to image a site a dimension of which is fixed within a certain range such as a size of a head, an interval between both eyes in addition to the body height to indicate the distance $L_2$ as the relative distance of the distance $L_1$.

Furthermore, the audio source 20 is not limited to persons, this may also be an object emitting audio such as a vehicle, a train, a bicycle, a motor cycle, a robot, and an animal, for example. In this case, it is possible to extract the audio source 20 from the imaged image to determine a type thereof, obtain a standard dimension for each determined type from a database and the like, and adjust a ratio in height in the formed image on the basis of the obtained standard dimension, thereby using to calculate the relative audio volume. Meanwhile, the above-described database may be provided within the information processing device 14 or may be arranged outside the information processing device 14 and necessary information may be appropriately obtained by communication.

Although it is described to obtain the relative audio volumes of a plurality of audio sources in this embodiment, the present disclosure is also applicable when obtaining relative displacement amounts of surfaces of a plurality of objects. In this case, the information processing device of the present disclosure may serve as a vibration monitor which detects vibration of a machine and a building as a surface displacement amount and detects occurrence of abnormality from change in the relative displacement amount.

<Configuration Example of Computer>

A series of processes of the information processing device 14 described above may be executed by hardware or may be executed by software. When a series of processes is executed by the software, a program which forms the software is installed on a computer. Herein, the computer includes a computer built in dedicated hardware, a general-purpose personal computer, for example, capable of executing various functions by various programs installed and the like.

Figure 11:
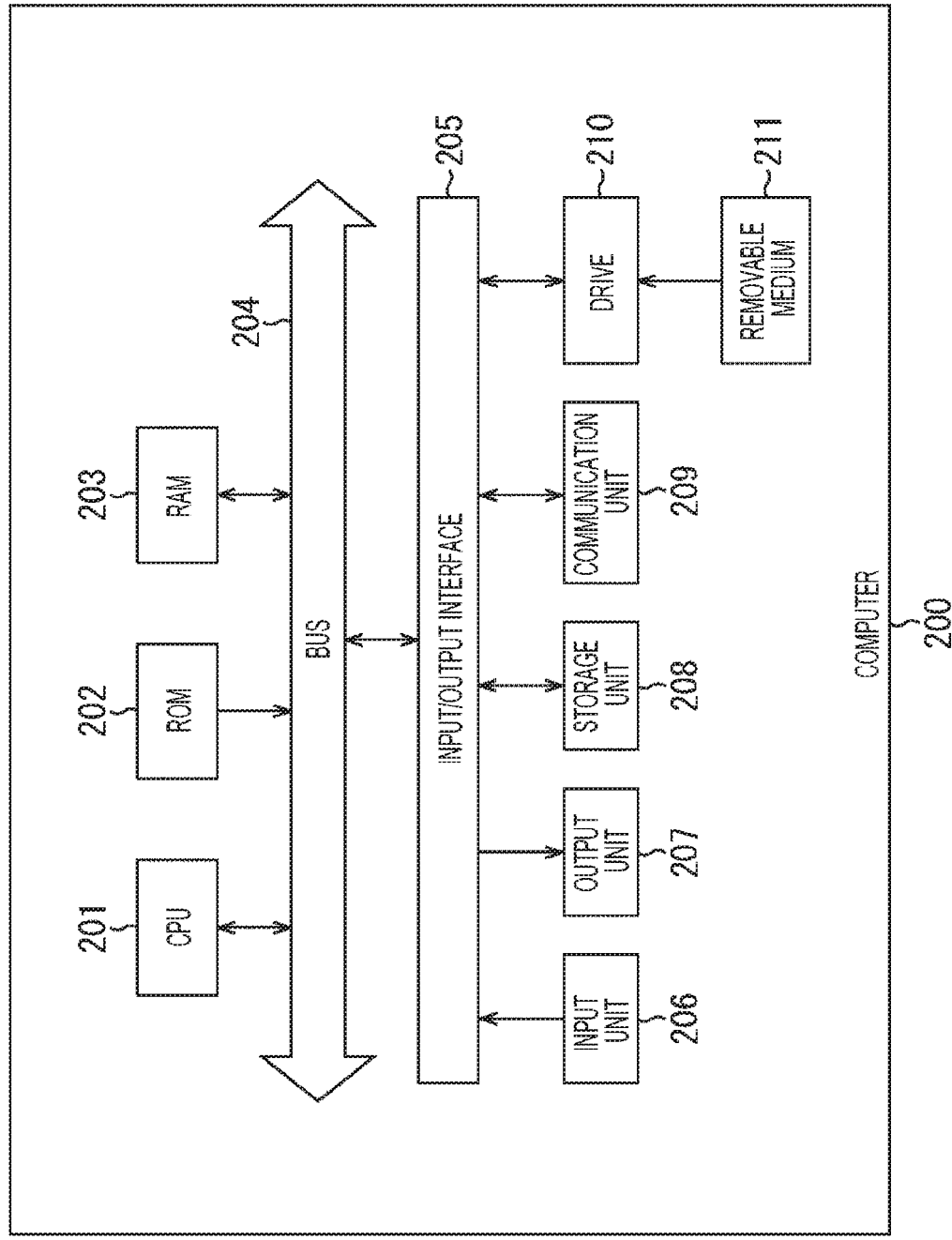
FIG. 11 is a block diagram illustrating a configuration example of a computer.

FIG. 11 is a block diagram illustrating a configuration example of the hardware of the computer which executes the above-described series of processes by the program.

In a computer 200, a central processing unit (CPU) 201, a read only memory (ROM) 202, and a random access memory (RAM) 203 are connected to one another through a bus 204.

An input/output interface 205 is further connected to the bus 204. An input unit 206, an output unit 207, a storage unit 208, a communication unit 209, and a drive 210 are connected to the input/output interface 205.

The input unit 206 is formed or a keyboard, a mouse, a microphone and the like. The output unit 207 is formed of a display, a speaker and the like. The storage unit 208 is formed of a hard disk, a non-volatile memory and the like. The communication unit 209 is formed of a network interface and the like. The drive 210 drives a removable medium 211 such as a magnetic disc, an optical disc, a magnetooptical disc, or a semiconductor memory.

In the computer 200 configured in the above described manner, the CPU 201 loads the program stored in the storage unit 208, for example, on the RAM 203 through the input/output interface 205 and the bus 204 to execute, and according to this, the above-described series of processes is performed.

Meanwhile, the program executed by the computer 200 may be the program of which processes are performed in chronological order in the order described in this specification or may be the program of which processes are performed in parallel or at necessary timing such as when a call is issued.

The embodiment of the present disclosure is not limited to the above-described embodiment and may be variously changed without departing from the scope of the present disclosure.

The present disclosure may also have the following configurations.

(1) An information processing device including:

an obtaining unit which obtains a speckle image obtained by imaging an interference state of reflection light of light obtained when irradiating an object with coherent light;

a distance measuring unit which measures a distance to the object;

a measuring unit which measures a movement amount of the obtained speckle image; and an arithmetic unit which performs an arithmetic operation of relative displacement amounts of surfaces of a plurality of objects on the basis of movement amounts of speckle images corresponding to the plurality of objects at different distances from an object plane on which the speckle image appears and measured distances to the objects.

(2) The information processing device according to (1) described above, wherein the object is an audio source, and the arithmetic unit performs an arithmetic operation of an audio volume ratio of a plurality of audio sources on the basis of the movement amounts of the speckle images corresponding to the plurality of audio sources at different distances from the object plane on which the speckle image appears and the measured distances to the audio sources.

(3) The information processing device according to (1) or (2) described above, further including:

a lighting unit which irradiates the object with the coherent light.

(4) The information processing device according to (3) described above, wherein the lighting unit irradiates the object with laser light or LED light.

(5) The information processing device according to (3) or (4) described above, wherein the distance measuring unit measures the distance to the object by using the coherent light emitted from the lighting unit.

(6) The information processing device according to (3) or (4) described above, wherein the distance measuring unit measures the distance to the object by a TOF method using the coherent light emitted from the lighting unit.

(7) The information processing device according to (3) or (4) described above, wherein the distance measuring unit measures the distance to the object by using parallax when the object is imaged by a plurality of cameras.

(8) The information processing device according to any one of (1) to (4) described above, wherein the distance measuring unit measures a ratio of the distances to the objects or the distances by using image heights on an image pickup element when the objects are imaged by a single camera.

(9) The information processing device according to any one of (1) to (4) described above, wherein the distance measuring unit specifies the objects by image processing of an imaged image by a single camera and calculates a ratio of the distances to the objects by using image heights on an image pickup element and a focal distance of an image forming element when the specified objects are imaged or measures the distances to the objects by using an average value of heights of the specified objects.

(10) The information processing device according to any one of (1) to (4) described above, wherein the distance measuring unit specifies the objects by image processing of an imaged image by a single camera, obtains information of the specified objects from a database, and calculates a ratio of the distances to the objects by using image heights on an image pickup element and a focal distance of an image forming element when the objects are imaged or measures the distances to the objects by using an average value of heights of the objects.

(11) The information processing device according to (10) described above, further including:

the database.

(12) The information processing device according to (10) described above, wherein the distance measuring unit obtains the information of the specified objects by communicating with the database arranged outside.

(13) The information processing device according to any one of (8) to (12) described above, wherein the obtaining unit also serves as the distance measuring unit.

(14) The information processing device according to any one of (1) to (13) described above, further including:

a focal distance obtaining unit which obtains a focal distance of a lens of an imaging unit which images the speckle image; and a correcting unit which corrects the measured movement amount of the speckle image by using obtained focal distances when the speckle images corresponding to the plurality of objects are imaged, wherein the arithmetic unit performs the arithmetic operation of the relative displacement amounts of the surfaces of the plurality of objects on the basis of the corrected movement amount of the speckle image and the measured distances to the audio sources.

(15) The information processing device according to any one of (2) to (14) described above, wherein the arithmetic unit further performs an arithmetic operation of audio volumes of the plurality of audio sources on the basis of the audio volume ratio of the plurality of audio sources the arithmetic operation of which is performed.

(16) An information processing method including:

an obtaining step of obtaining a speckle image obtained by imaging an interference state of reflection light of light obtained when irradiating an object with coherent light;

a distance measuring step of measuring a distance to the object;

a measuring step of measuring a movement amount of the obtained speckle image; and an arithmetic step of performing an arithmetic operation of relative displacement amounts of surfaces of a plurality of objects on the basis of movement amounts of speckle images corresponding to the plurality of objects at different distances from an object plane on which the speckle image appears and measured distances to the objects, the method performed by an image processing device.

(17) A program which allows a computer to serve as:

an obtaining unit which obtains a speckle image obtained by imaging an interference state of reflection light of light obtained when irradiating an object with coherent light;

a distance measuring unit which measures a distance to the object;

a measuring unit which measures a movement amount of the obtained speckle image; and an arithmetic unit which performs an arithmetic operation of relative displacement amounts of surfaces of a plurality of objects on the basis of movement amounts of speckle images corresponding to the plurality of objects at different distances from an object plane on which the speckle image appears and measured distances to the objects.

REFERENCE SIGNS LIST

10 Audio detecting system
11 Coherent light source lighting device
12 Imaging device
13 Distance measuring device
20 Audio source
21 Speckle image
31 Speckle image obtaining unit
32 Speckle movement amount measuring unit
33 Audio source distance obtaining unit
34 Object plane distance obtaining unit
35 Audio volume ratio arithmetic unit
36 Focal distance obtaining unit
37 Focal distance ratio arithmetic unit
38 Speckle movement amount correcting unit
200 Computer
201 CPU

The invention claimed is:

1. An information processing device, comprising:
    an obtaining unit configured to obtain a plurality of speckle images, wherein
        a speckle image of the plurality of speckle images is an image of an interference state of reflection light of light, and
        the reflection light is obtained based on irradiation of an object of a plurality of objects with coherent light;
    a distance measuring unit configured to determine a plurality of distances from the information processing device to each of the plurality of objects;
    a measuring unit configured to determine a plurality of movement amounts of a corresponding one of the plurality of speckle images; and
    an arithmetic unit configured to determine a displacement amount ratio of a plurality of relative displacement amounts of surfaces of the plurality of objects based on the plurality of movement amounts and the plurality of distances, wherein
        the plurality of objects is at different distances from an object plane, and the plurality of speckle images appears on the object plane.

2. The information processing device according to claim 1, wherein
the object is an audio source of a plurality of audio sources, and
the arithmetic unit is further configured to determine an audio volume ratio of the plurality of audio sources based on the plurality of movement amounts and the plurality of distances, wherein the plurality of audio sources is at different distances from the object plane.

3. The information processing device according to claim 2, further comprising:
a lighting unit configured to irradiate the object with the coherent light.

4. The information processing device according to claim 3, wherein the lighting unit is further configured to irradiate the object with one of laser light or LED light.

5. The information processing device according to claim 3, wherein the distance measuring unit is further configured to determine the plurality of distances based on the coherent light.

6. The information processing device according to claim 3, wherein the distance measuring unit is further configured to determine the plurality of distances by a (Time of Flight) TOF method based on the coherent light.

7. The information processing device according to claim 3, wherein the distance measuring unit is further configured to determine the plurality of distances based on parallax when the object is imaged by a plurality of cameras.

8. The information processing device according to claim 2, wherein the distance measuring unit is further configured to determine a ratio of the plurality of distances, wherein
the plurality of distances is determined based on a plurality of image heights on an image pickup element when the plurality of objects is imaged by a single camera.

9. The information processing device according to claim 2, wherein the distance measuring unit is further configured to:
specify the plurality of objects based on image processing of an imaged image by a single camera; and
calculate a ratio of the plurality of distances based on a plurality of image heights on an image pickup element and a focal distance of an image forming element, wherein
the plurality of distances is determined based on an average value of heights of the plurality of specified objects.

10. The information processing device according to claim 2, wherein the distance measuring unit is configured to:
specify the plurality of objects by image processing of an imaged image by a single camera;
obtain information of the plurality of specified objects from a database; and
calculate a ratio of the plurality of distances to the plurality of objects based on a plurality of image heights on an image pickup element and a focal distance of an image forming element, wherein
the plurality of distances is determined based on an average value of heights of the plurality of objects.

11. The information processing device according to claim 10, further comprising the database.

12. The information processing device according to claim 10, wherein the distance measuring unit is further configured to obtain the information of the plurality of specified objects based on a communication with the database.

13. The information processing device according to claim 1, further comprising:
a focal distance obtaining unit configured to obtain a plurality of focal distances of a plurality of lenses of an imaging unit which captures the speckle image; and
a correcting unit configured to correct the plurality of movement amounts based on the plurality of focal distances, wherein
the arithmetic unit is further configured to determine the displacement amount ratio based on the plurality of corrected movement amounts and the plurality of distances.

14. The information processing device according to claim 2, wherein the arithmetic unit is further configured to determine a plurality of audio volumes of the plurality of audio sources based on the audio volume ratio of the plurality of audio sources.

15. An information processing method, comprising:
in an information processing device:
obtaining a plurality of speckle images, wherein
a speckle image of the plurality of speckle images is an image of an interference state of reflection light of light, and
the reflection light is obtained based on irradiation of an object of a plurality of objects with coherent light;
determining a plurality of distances from the information processing device to each of the plurality of objects;
determining a plurality of movement amounts of a corresponding one of the plurality of speckle images; and
determining a displacement amount ratio of a plurality of relative displacement amounts of surfaces of the plurality of objects based on the plurality of movement amounts and the plurality of distances, wherein
the plurality of objects is at different distances from an object plane, and
the plurality of speckle images appears on the object plane.

16. A non-transitory computer-readable medium, having stored thereon computer-readable instructions, which when executed by an information processing device, cause the information processing device to execute operations, the operations comprising:
obtaining a plurality of speckle images, wherein
a speckle image of the plurality of speckle images is an image of an interference state of reflection light of light, and
the reflection light is obtained based on irradiation of an object of a plurality of objects with coherent light;
determining a plurality of distances from the information processing device to each of the plurality of objects;
determining a plurality of movement amounts of a corresponding one of the plurality of speckle images; and
determining a displacement amount ratio of a plurality of relative displacement amounts of surfaces of the plurality of objects based on the plurality of movement amounts and the plurality of distances, wherein
the plurality of objects is at different distances from an object plane, and
the plurality of speckle images appears on the object plane.

* * * * *